(12) United States Patent
Domeniconi et al.

(10) Patent No.: US 11,409,754 B2
(45) Date of Patent: Aug. 9, 2022

(54) NLP-BASED CONTEXT-AWARE LOG MINING FOR TROUBLESHOOTING

(71) Applicant: INTERNATIONAL BUSINESS MACHINES CORPORATION, Armonk, NY (US)

(72) Inventors: Giacomo Domeniconi, Yorktown Heights, NY (US); Eun Kyung Lee, Yorktown Heights, NY (US); Alessandro Morari, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 346 days.

(21) Appl. No.: 16/437,989

(22) Filed: Jun. 11, 2019

(65) Prior Publication Data

US 2020/0394186 A1    Dec. 17, 2020

(51) Int. Cl.
*G06F 16/00*    (2019.01)
*G06F 16/2458*   (2019.01)
(Continued)

(52) U.S. Cl.
CPC .......... *G06F 16/2465* (2019.01); *G06F 17/18* (2013.01); *G06F 40/205* (2020.01); *G06F 40/284* (2020.01); *G06N 3/04* (2013.01)

(58) Field of Classification Search
CPC ............... G06F 40/284; G06F 16/2465; G06F 16/2471; G06F 40/205; G06F 40/289; G06F 17/40; G06N 3/04; G06N 3/02
See application file for complete search history.

(56) References Cited

U.S. PATENT DOCUMENTS 8,036,464 B2 * 10/2011 Sridhar ................. G06F 40/289
                                                  382/177
9,280,520 B2    3/2016 Guenigault et al.
(Continued)

FOREIGN PATENT DOCUMENTS

| CN | 106777191 | 12/2016 |
| CN | 108399163 | 3/2018 |
| WO | WO 2018/092924 | 5/2018 |

OTHER PUBLICATIONS

International Search Report dated Aug. 31, 2020.
(Continued)

*Primary Examiner* — Leslie Wong
(74) *Attorney, Agent, or Firm* — F. Chau & Associates, LLC (57) ABSTRACT

A method for context-aware data mining of a text document includes receiving a list of words parsed and preprocessed from an input query; computing a related distributed embedding representation for each word in the list of words using a word embedding model of the text document being queried; aggregating the related distributed embedding representations of all words in the list of words to represent the input query with a single embedding, by using one of an average of all the related distributed embedding representations or a maximum of all the related distributed embedding representations; retrieving a ranked list of document segments of N lines that are similar to the aggregated word embedding representation of the query, where N is a positive integer provided by the user; and returning the list of retrieved segments to a user.

13 Claims, 5 Drawing Sheets

(51) Int. Cl.
  *G06F 17/18* (2006.01)
  *G06N 3/04* (2006.01)
  *G06F 40/205* (2020.01)
  *G06F 40/284* (2020.01)

(56) References Cited

U.S. PATENT DOCUMENTS

| | | | |
|---|---|---|---|
| 9,842,301 B2 | 12/2017 | Gunjan | |
| 9,983,924 B2 | 5/2018 | Schnegelberger et al. | |
| 9,990,353 B2 | 6/2018 | Peng | |
| 10,664,512 B1* | 5/2020 | He | G06N 20/00 |
| 2004/0254919 A1* | 12/2004 | Giuseppini | G06F 16/903 |
| 2005/0060643 A1* | 3/2005 | Glass | G06F 40/169 |
| | | | 715/205 |
| 2006/0106793 A1* | 5/2006 | Liang | G06F 16/3329 |
| 2008/0040339 A1* | 2/2008 | Zhou | G06F 16/3334 |
| 2009/0300054 A1* | 12/2009 | Fisher | G06F 16/84 |
| 2010/0074130 A1* | 3/2010 | Bertrand | H04W 28/0221 |
| | | | 370/252 |
| 2011/0208715 A1* | 8/2011 | Ni | G06F 16/9535 |
| | | | 707/709 |
| 2013/0326406 A1* | 12/2013 | Reiley | G06F 3/048 |
| | | | 715/810 |
| 2014/0039877 A1 | 2/2014 | Guenigault et al. | |
| 2016/0162467 A1* | 6/2016 | Munro | G06F 40/216 |
| | | | 704/9 |
| 2017/0011289 A1* | 1/2017 | Gao | G06F 40/268 |
| 2017/0242919 A1* | 8/2017 | Chandramouli | G06F 16/3344 |
| 2017/0293542 A1 | 10/2017 | Xu et al. | |
| 2018/0137101 A1* | 5/2018 | Burchard | G06F 40/211 |
| 2018/0165147 A1 | 6/2018 | Debnath et al. | |
| 2019/0043486 A1* | 2/2019 | Salloum | G10L 15/16 |
| 2019/0095417 A1* | 3/2019 | Xu | G06F 40/216 |
| 2019/0171660 A1* | 6/2019 | Kershaw | G06F 16/353 |
| 2019/0347328 A1* | 11/2019 | Rush | G10L 15/197 |
| 2019/0354524 A1* | 11/2019 | Xu | G06F 11/0778 |
| 2020/0104313 A1* | 4/2020 | Jayaraman | G06F 16/345 |
| 2020/0117709 A1* | 4/2020 | Galitsky | G06F 16/3329 |
| 2020/0151247 A1* | 5/2020 | Mei | G06F 40/295 |
| 2020/0193153 A1* | 6/2020 | Lee | G06F 40/226 |
| 2020/0311208 A1* | 10/2020 | Koohmarey | G06N 3/006 |
| 2020/0372550 A1* | 11/2020 | Beier | G06F 40/268 |
| 2020/0402049 A1* | 12/2020 | Pi Farias | G06Q 20/027 |
| 2020/0409963 A1* | 12/2020 | Higashi | G06F 16/93 |

OTHER PUBLICATIONS

Jiexun Li, et al., "An Intelligent Approach To Data Extraction and Task Indentification for Process Mining," Information Systems Frontiers (2015) 17: pp. Nos. 1195-1208.

Christophe Bertero, et al., "Experience Report: Log Mining Using Natural Language Processing and Application to Anomaly Detection." pp. 1-10, 28th International Symposium on Software Reliability Engineering (ISSRE 2017), Oct. 2017.

* cited by examiner

NLP-BASED CONTEXT-AWARE LOG MINING FOR TROUBLESHOOTING

BACKGROUND

Technical Field

Embodiments of the disclosure are directed to knowledge extraction, representation, retrieval and reasoning.

Discussion of the Related Art

Word embeddings are a class of techniques where individual words are represented as real-valued vectors in a predefined vector space. Each word is associated with a point in a vector space. Each word is represented by a real-valued feature vector having tens or hundreds of dimensions, where each dimension is associated with a feature that represents an aspect of the word. This is in contrast to the thousands or millions of dimensions required for sparse word representations, such as a one-hot encoding, where a word is represented by a single component in a vector whose size corresponds to the size of the vocabulary, a representation known as a "bag of words". On the other hand, the number of features is much smaller than the size of the is vocabulary. The distributed representation is learned based on the usage of words, based on the idea that words that have similar context will have similar meanings. This allows words that are used in similar ways to result in having similar representations, naturally capturing their meaning. This can be contrasted with a bag of words model where different words with similar meanings can have very different representations. There are computational benefits to using dense and low-dimensional vectors, in that the majority of neural network toolkits do not work well with very high-dimensional, sparse vectors. Another benefit of the dense representations is generalization power: if it is believed that some features may provide similar clues, it is worthwhile to provide a representation that is able to capture these similarities. In word embedding natural language processing (NLP), words or phrases from natural languages are represented by vectors of real numbers. The representation can be exclusively based on how the word is used, i.e., its context.

Log data from a computing system are vital for understanding and diagnosing system problems. Log data are vast with respect to volume, variety, velocity, etc., and their usage for system diagnostics and troubleshooting is a challenge for system administrators. The log data of a computing system may be represented in the word embedding NLP format, although the specific representation is not specified. For example, each word in the log can be used as a token, but also an entire line of the log can be considered as a token.

SUMMARY

Exemplary embodiments of the present disclosure are directed to a novel interface in which a user can express a query as any kind of text, such as words, lines, paragraphs, etc., and a specialized NLP-based algorithm returns segments of a computer system log data that have a similar word context to the query. An approach according to an embodiment of the disclosure is based on the context of the words in the query, rather than on a simple string matching. This improves the ability of a user to find meaningful events in the log. An approach according to an embodiment is based on unsupervised learning. It relies on text information already existing in the logs, and can be applied without any pre-existing knowledge of the events, the keywords, or the structure of the log text.

According to an embodiment of the disclosure, there is provided a method of context-aware data mining of a text document, including receiving a list of words parsed and preprocessed from an input query, computing a related distributed embedding representation for each word in the list of words using a word embedding model of the text document being queried, aggregating the related distributed embedding representations of all words in the list of words to represent the input query with a single embedding, retrieving a ranked list of document segments of N lines that are similar to the aggregated word embedding representation of the query, and returning the list of retrieved segments to a user.

According to a further embodiment of the disclosure, aggregating the related distributed embedding representations is performed using one of an average of all the related distributed embedding representations or a maximum of all the related distributed embedding representations.

According to a further embodiment of the disclosure, N is a positive integer provided by the user.

According to a further embodiment of the disclosure, the method includes training the word embedding model of the text document by parsing and preprocessing the text document and producing a tokenized word list, defining a word dictionary from the tokenized word list, where the word dictionary includes at least some of the tokens in the tokenized word list, and training the word embedding model, where the word embedding model is a neural network model that represents each word or line in the word dictionary by a vector.

According to a further embodiment of the disclosure, parsing and preprocessing the text document includes removing all punctuation and a preamble from each line in the text document, parsing numeric data, tokenizing the text document in words to form a tokenized word list, where a token is one of a single word, an N-gram of N consecutive words, or an entire line of the document, and returning the tokenized word list.

According to a further embodiment of the disclosure, the text document is a computer system log, and the numeric data includes decimal numbers and hexadecimal addresses.

According to a further embodiment of the disclosure, the method includes parsing and preprocessing the input query by removing all punctuation from the input query, parsing numeric data, tokenizing the input query in words to produce a tokenized word list, wherein a token is one of a single word, an N-gram of N consecutive words, or an entire line of the input query, and returning the tokenized word list.

According to a further embodiment of the disclosure, retrieving a ranked list of document segments of N lines that are similar to the aggregated word embedding representation of the query includes comparing the aggregated word embedding representation of the query with the word embedding model of the text document using a similarity metric, and returning those segments of the word embedding model of the text document whose similarity to the aggregated word embedding representation of the query is greater than a predetermined threshold, and ranking the retrieved document segments according to the similarities.

According to another embodiment of the disclosure, there is provided a method of context-aware data mining of a text document, including parsing and preprocessing the text document and producing a tokenized word list, defining a word dictionary from the tokenized word list, wherein the word dictionary includes at least some of the tokens in the tokenized word list, and training the word embedding model, wherein the word embedding model is a neural network model that represents each word or line in the word dictionary by a vector. Parsing and preprocessing the text document includes removing all punctuation and a preamble from each line in the text document, parsing numeric data, tokenizing the text document in words to form a tokenized word list, where a token is one of a single word, an N-gram of N consecutive words, or an entire line of the document, and returning the tokenized word list.

According to a further embodiment of the disclosure, the method includes receiving a list of words parsed and preprocessed from an input query, computing a related distributed embedding representation for each word using the word embedding model of the text document being queried, aggregating the related distributed embedding representations of all words in the list of words to represent the query with a single embedding, retrieving a ranked list of document segments of N lines that are similar to the aggregated word embedding representation of the query, and returning the list of retrieved segments to a user.

According to a further embodiment of the disclosure, the method includes parsing and preprocessing the input query by removing all punctuation from the input query, parsing numeric data, tokenizing the input query in words to produce a tokenized word list, wherein a token is one of a single word, an N-gram of N consecutive words, or an entire line of the input query, and returning the tokenized word list.

According to a further embodiment of the disclosure, retrieving a ranked list of document segments of N lines that are similar to the aggregated word embedding representation of the query includes comparing the aggregated word embedding representation of the query with the word embedding model of the text document using a similarity metric, and returning those segments of the word embedding model of the text document whose similarity to the aggregated word embedding representation of the query is greater than a predetermined threshold, and ranking the retrieved document segments according to the similarities.

According to a further embodiment of the disclosure, the text document is a computer system log, and the numeric data includes decimal numbers and hexadecimal addresses.

According to a further embodiment of the disclosure, aggregating the related distributed embedding representations is performed using one of an average of all the related distributed embedding representations or a maximum of all the related distributed embedding representations.

According to a further embodiment of the disclosure, N is a positive integer provided by the user.

According to another embodiment of the disclosure, there is provided a program storage device readable by a computer, tangibly embodying a program of instructions executable by the computer to perform the method steps for context-aware data mining of a text document.

DETAILED DESCRIPTION OF EXEMPLARY EMBODIMENTS

Exemplary embodiments of the disclosure as described herein generally provide methods for NLP-based context-aware log mining. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Figure 1:
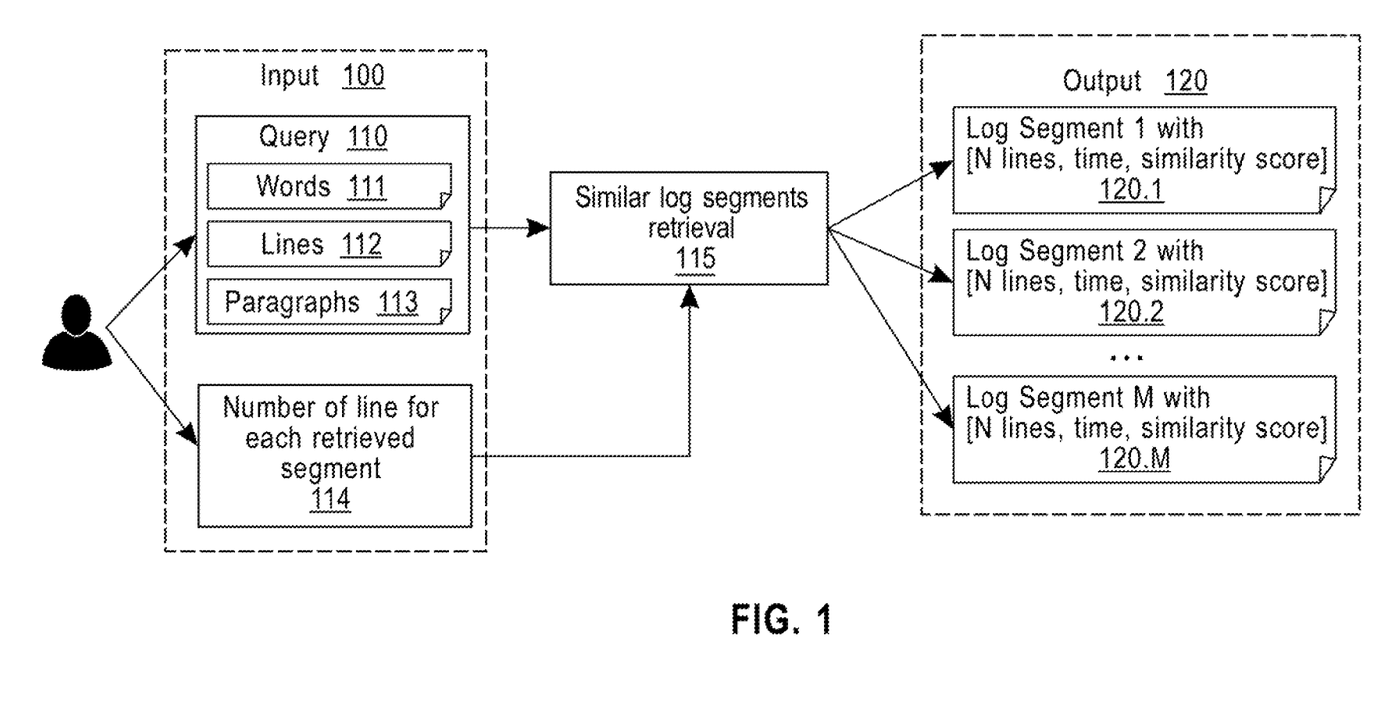
FIG. 1 is a block diagram of a method of processing a user query according to an embodiment of the disclosure.

FIG. 1 is a block diagram of a method of processing a user query according to an embodiment of the disclosure. FIG. 1 depicts a use case in which a user provides a query 110, which can be individual words 111, lines 112, or paragraphs 113, the size of the retrieved segments with the number of lines 114, and a similarity threshold that defines how many segments should be returned. The query 110 and number of lines 114 are input for a method according to an embodiment for retrieving 115 similar log segments from a computer system log. A method according to an embodiment will return as output 120 a set of segments 120.1, 120.2, ..., 120.m that are ordered by similarity to the query text.

Figure 2:
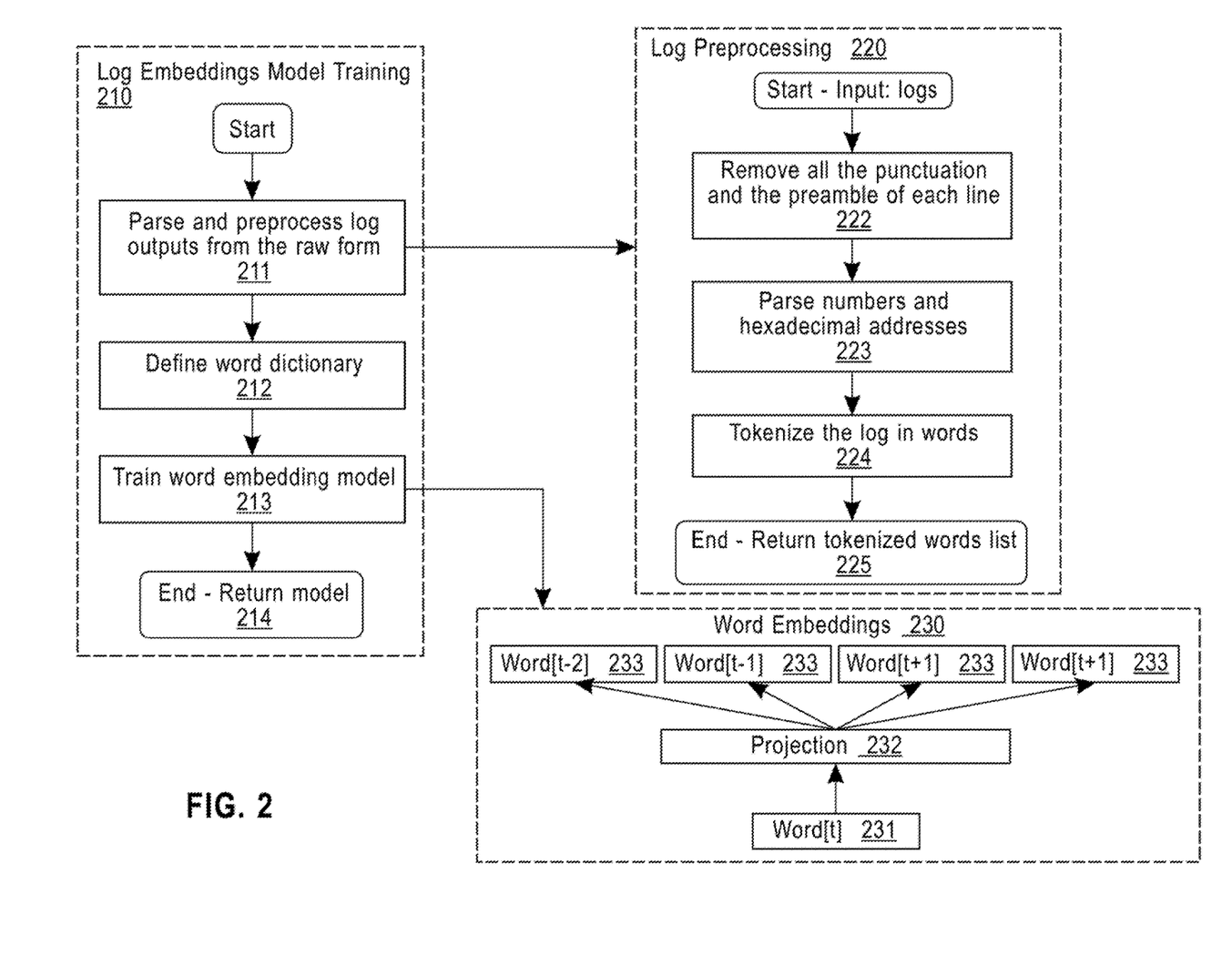
FIG. 2 is a block diagram of a method for creating a model, according to an embodiment of the disclosure.

FIG. 2 is a block diagram of a method for creating a model, according to an embodiment of the disclosure. FIG. 2 depicts the steps needed to create a model according to an embodiment. On the left is a flowchart of a method 210 of training a word embedding model. On the right-top is a flowchart of a method 220 for processing the system log files to get a tokenized word list, and on the right-bottom is block diagram 230 of a common word embedding structure.

Referring to flowchart 210, a method of training of a model includes parsing and preprocessing 211 log outputs from the raw data of a computer system log, defining a word dictionary 212, and training 213 the word embedding model.

Method 220 are steps involved in parsing and preprocessing 211 log outputs from the raw data, and include removing all the punctuation and the preamble of each line 222, parsing numbers and hexadecimal addresses 223, tokenizing the log in words 224, and returning the tokenized word list 225. The numbers and hex addresses were parsed using a specific token. According to embodiments, decimal numbers are represented by one token, hexadecimal addresses are represented by another token, and the information of a number or an address can be left with the token as a placeholder, although the context is not limited to the specific value. A text processing technique was not used for the words, although any NLP technique could be used. Tokenizing the log means splitting the logs into tokens, where a token can be defined as a single word or an N-gram of N consecutive words, or also as an entire line of the log. Once the log is tokenized, the dictionary is the set of all the tokens, or a selected subset of them, such as the most frequent tokens.

According to an embodiment, the dictionary is used to define and represent the words (or lines) considered in the word embedding model. Referring step 231 of FIG. 2, the input word w[t] is represented as a one-hot vector that has a number of elements as the size of the dictionary, with all 0s and a 1 in the element corresponding to the word (or line). At this purpose, a defined dictionary is needed to create these vectors. For example, a one-hot vector representation of "Rome", "Paris", "Italy", and "France" in a V-dimensional vector space would look like":

Rome=[1, 0, 0, 0, 0, . . . , 0],
Paris=[0, 1, 0, 0, 0, . . . , 0],
Italy=[0, 0, 1, 0, 0, . . . , 0],
France=[0, 0, 0, 1, 0, 0].

The word embedding model 230 uses a distance metric between log segments of N lines, where N is a user-defined parameter. The distance metric is used to define how similar are the contexts of two log segments. Specifically, the metric is used to retrieve the top N segments that have highest similarity to the user query. The word embedding model is a neural network model that represents a word (or a line) with an embedding, i.e., a vector. A Word[t] 231 is then projected 232 into word embeddings 233 that, for a window size of 5, include Word[t−2], Word[t−1], Word[t+1], and Word[t+2]. The window size is one of the parameters of the model provided by a user. Once the word embedding model has been trained, a distance metric can be used between segments of N lines of the log, where N is a user defined parameter. A typical distance metric between word embeddings, i.e., vectors, is a cosine similarity. In addition, a supervised Learning approach can be used. This involves training a supervised model, such as a long short-term memory (LSTM), to predict the similarity between documents)

Figure 3:
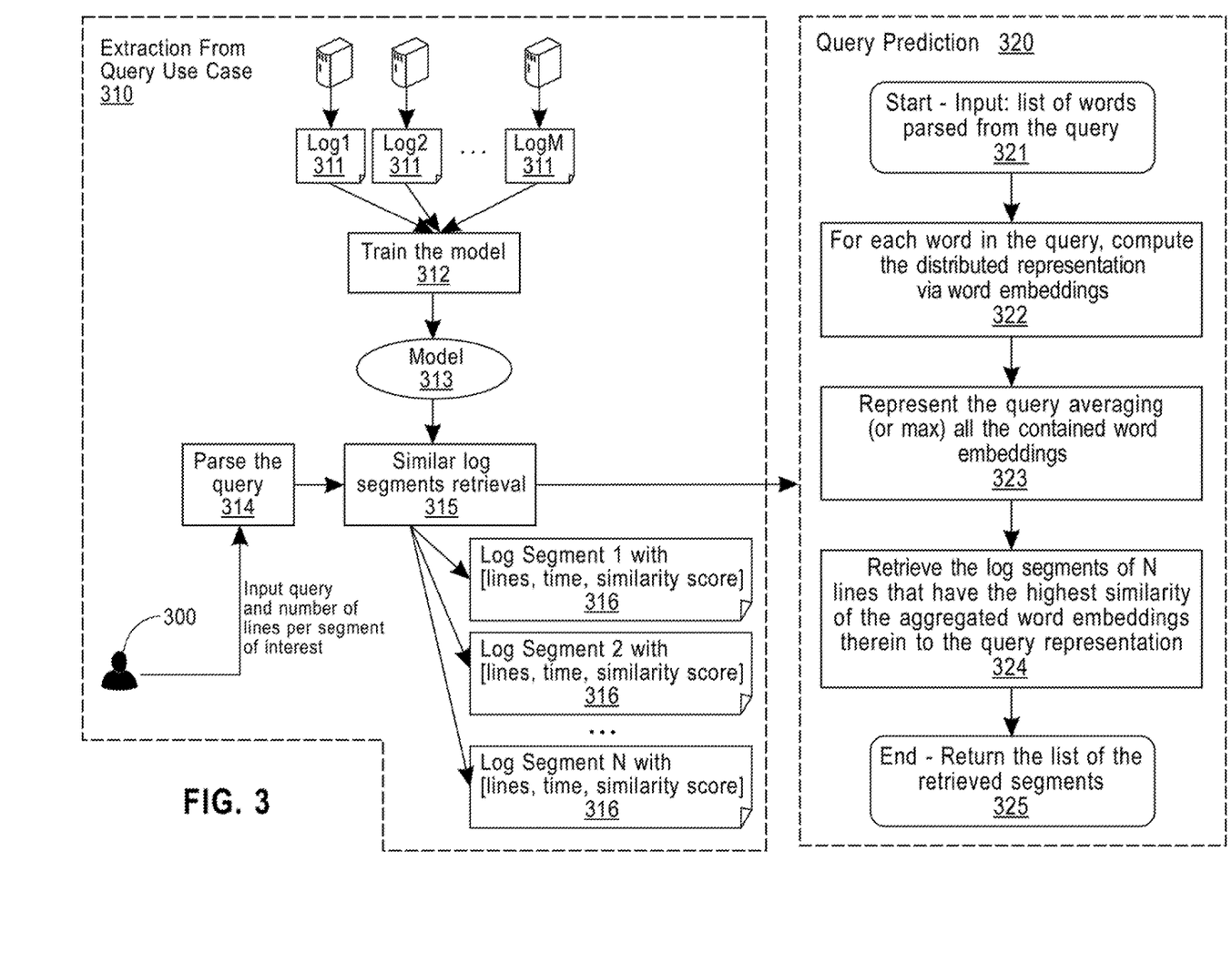
FIG. 3 is a block diagram of a method according to another embodiment of the disclosure.

FIG. 3 is a block diagram of a search during the use case, and includes flowcharts that depict extraction from a query use case 310 and query prediction 320. Referring to query use case 310, a user 300 provides a query, such as a portion of unstructured text of interest, and a number of lines per segment of interest. Query use case 310 also shows a model being trained at step 312 from system log inputs 311 to create a model 313. The steps of training the model at step 312 correspond to a method according to an embodiment of training a model 210 of FIG. 2.

The query is parsed at step 314 based on the method 220 for processing the system log files in FIG. 2, which includes the steps of removing all punctuation and the preamble of each line, parsing numbers and hexadecimal addresses, and tokenizing the query in words: $q=[w_1, w_2, \ldots, w_N]$.

The output q is then provided as input to step 315 of retrieving similar log segments, which corresponds to step 115 of FIG. 1, and which outputs log segments 316. The model will retrieve the ordered list of segments similar to the query and they will be outputted to the user.

Block 320 is a flowchart of steps involved in query prediction, and starts by receiving the list of words at step 321 parsed and preprocessed from the input. Then, at step 322, the related distributed embedding representation $we_i$ is computed for each word $w_i$, using the word embedding model 230 of FIG. 2. The "distributed embedding representation" is the representation of a word (or a line) given by the word embedding model. At step 323, the related distributed embedding representations $we_i$ is aggregated with the average (or maximum) of all the distributed word embeddings $we_i$ to represent the query with a single embedding qe. Each segment of N tines in the log data is represented in the same way. The word embedding yields a representation with a vector for each word or line. Since a query contains more than one word or line, all the representations need to be aggregated into one single vector, to represent the entire query as a vector, after which the similarity metric, such as the cosine similarity, can be used.

At step 324, a ranked list of log segments of N lines is retrieved that have higher similarity of aggregated word embeddings therein with respect to the query representation. The ranked list of log segments is retrieved by comparing the aggregated word embedding representation of the query with the word embedding model of the log data using a similarity metric, and returning those segments of the word embedding model of the log data whose similarity is greater than a predetermined threshold, and ranking the retrieved segments according to the similarity values. The list of retrieved segments is returned at step 325, and are output at step 316.

A practical example of a method of processing a user query according to an embodiment of the disclosure is as follows. A method begins by receiving a user input query of word $w_q$. Suppose that the word $w_q$ appears very often in a pattern like $w_1, w_2, w_q, w_3, w_4$. With an exact matching this pattern can likely be retrieved by searching for $w_q$. Now, suppose that there exists another pattern of word like $w_1, w_5, w_6, w_3, w_4$. With lexical matching, this pattern will not be retrieved because it does not contain the query $w_q$. However, with a proposed NLP method according to an embodiment of the disclosure, the context of these two log segments is very similar and the query pattern can be retrieved and displayed to the user.

Although embodiments of the disclosure have been described in the context of querying a computer system log, it will be apparent to those of skill in the art that methods according to embodiments of the disclosure can be applied to querying any text document that is too large to be searched or comprehended by a single person.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
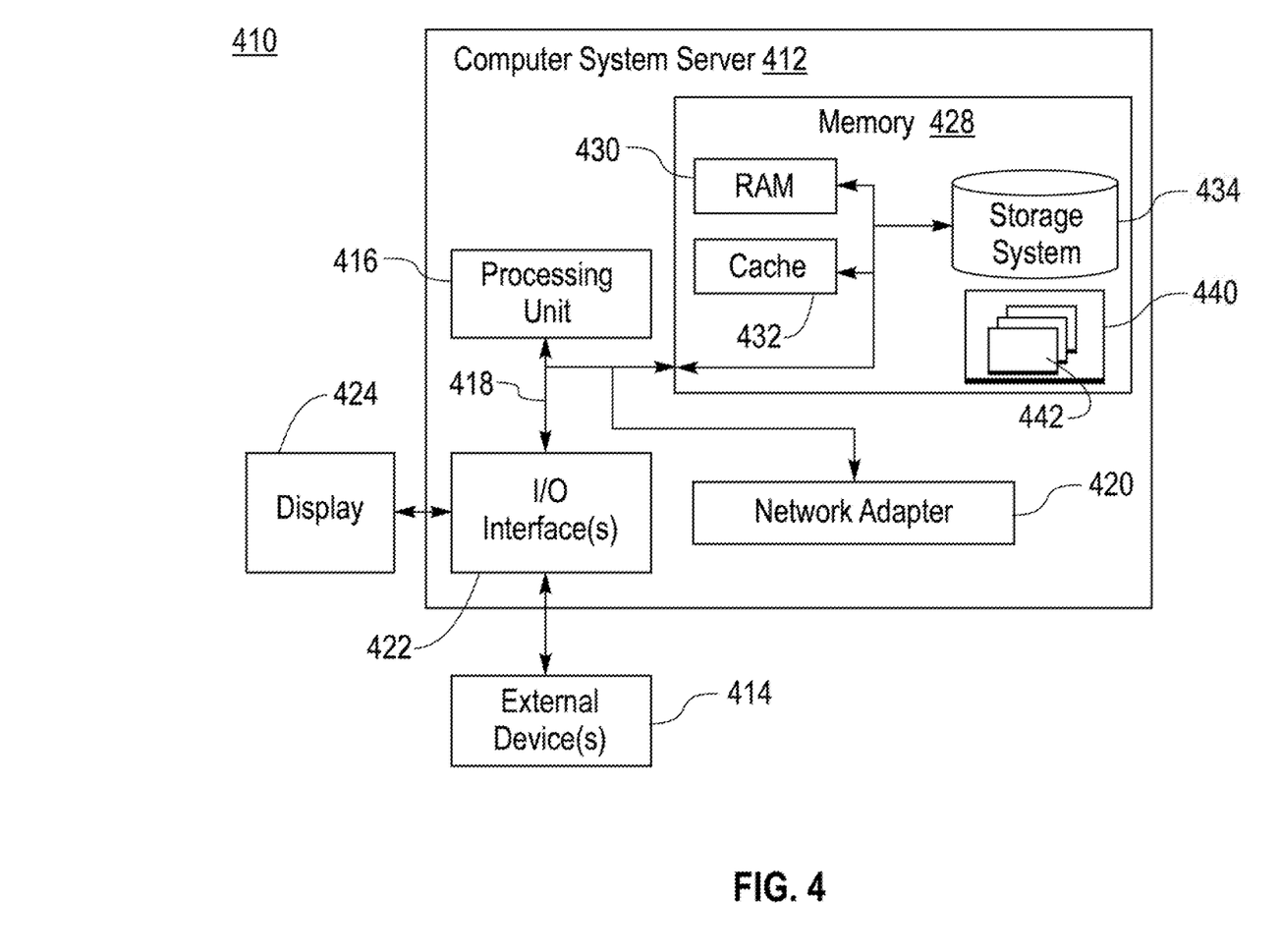
FIG. 4 is a schematic of an exemplary cloud computing node that implements an embodiment of the disclosure.

Referring now to FIG. 4, a schematic of an example of a cloud computing node is shown. Cloud computing node 410 is only one example of a suitable cloud computing node and is not intended to suggest any limitation as to the scope of use or functionality of embodiments of the disclosure described herein. Regardless, cloud computing node 410 is capable of being implemented and/or performing any of the functionality set forth herein above.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data strictures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the disclosure as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
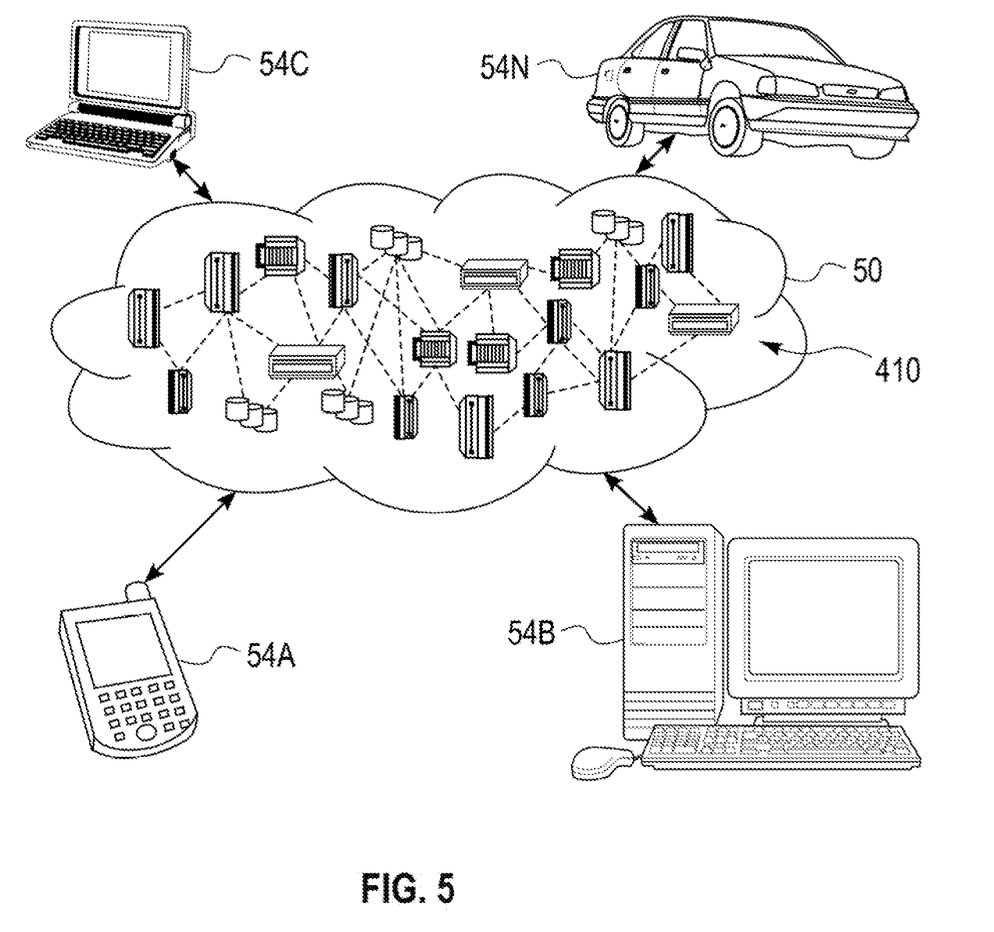
FIG. 5 shows an exemplary cloud computing environment according to embodiments of the disclosure.

Referring now to FIG. 5, illustrative cloud computing environment 50 is depicted. As shown, cloud computing environment 50 comprises one or more cloud computing nodes 400 with which local computing devices used by cloud consumers, such as, for example, personal digital assistant (PDA) or cellular telephone 54A, desktop computer 54B, laptop computer 54C, and/or automobile computer system 54N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 400 and cloud computing environment 50 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method of context-aware data mining of a text document, comprising the steps of:
receiving a list of words parsed and preprocessed from an input query, wherein each word in the input query is represented as a one-hot vector that has a same number of elements as a size of a dictionary created from the text document, with a 1 in an element corresponding to each word and 0s elsewhere;
computing a related distributed embedding representation for each word in the list of words using a word embedding model of the text document being queried, wherein the word embedding model is a neural network model that represents each word or line in the word dictionary by an embedded vector of real numbers, and projecting each word in the list of words into the word embedding model;
aggregating the related distributed embedding representations of all words in the list of words to represent the input query with a single embedded vector;
aggregating each text document segment of N lines to represent each text document segment of N lines with a single embedded vector;
retrieving a ranked list of text document segments of N lines that have a highest similarity to the aggregated word embedding representation of the query, and
returning the list of retrieved text document segments to a user.

2. The method of claim 1, wherein aggregating the related distributed embedding representations is performed using one of
an average of all the related distributed embedding representations or
a maximum of all the related distributed embedding representations.

3. The method of claim 1, wherein N is a positive integer provided by the user.

4. The method of claim 1, further comprising training the word embedding model of the text document, including the steps of:
parsing and preprocessing the text document and producing a tokenized word list;
defining a word dictionary from the tokenized word list, wherein the word dictionary includes at least some of the tokens in the tokenized word list; and
training the word embedding model.

5. The method of claim 4, wherein parsing and preprocessing the text document comprises the steps of:
removing all punctuation and a preamble from each line in the text document;
parsing numeric data;
tokenizing the text document in words to form a tokenized word list, wherein a token is one of a single word, an N-gram N consecutive words, or an entire line of the document; and
returning the tokenized word list.

6. The method of claim 5, wherein
the text document is a computer system log, and the numeric data includes decimal numbers and hexadecimal addresses.

7. The method of claim 1, further comprising parsing and preprocessing the input query by
removing all punctuation from the input query,
parsing numeric data,
tokenizing the input query in words to produce a tokenized word list, wherein a token is one of a single word, an N-gram of N consecutive words, or an entire line of the input query, and
returning the tokenized word list.

8. The method of claim 1, wherein retrieving a ranked list of text document segments of N lines that are similar to the aggregated word embedding representation of the query includes
comparing the aggregated word embedding representation of the query with the word embedding model of the text document segment of N lines using a similarity metric, and
retrieving those word embedding model representations of the text document segments of N lines whose similarity to the aggregated word embedding representation of the query is greater than a predetermined threshold, and
ranking the retrieved text document segments according to the similarities.

9. A program storage device readable by a computer, tangibly embodying a program of instructions executable by the computer to perform the method steps for context-aware data mining of a text document, comprising the steps of:
receiving a list of words parsed and preprocessed from an input query, wherein each word in the input query is represented as a one-hot vector that has a same number of elements as a size of a dictionary created from the text document, with a 1 in an element corresponding to each word and 0s elsewhere;
computing a related distributed embedding representation for each word in the list of words using a word embedding model of the text document being queried, wherein the word embedding model is a neural network model that represents each word or line in the word dictionary by an embedded vector of real numbers, and projecting each word in the list of words into the word embedding model;
aggregating the related distributed embedding representations of all words in the list of words to represent the input query with a single embedded vector;
aggregating each text document segment of N lines to represent each text document segment of N lines with a single embedded vector;
retrieving a ranked list of text document segments of N lines that have a highest similarity to the aggregated word embedding representation of the query, and
returning the list of retrieved text document segments to a user.

10. The computer readable program storage device of claim 9, wherein the method further comprises training the word embedding model of the text document, including the steps of:
parsing and preprocessing the text document and producing a tokenized word list;
defining a word dictionary from the tokenized word list, wherein the word dictionary includes at least some of the tokens in the tokenized word list; and
training the word embedding model,
wherein parsing and preprocessing the text document comprises the steps of:
removing all punctuation and a preamble from each line in the text document,
parsing numeric data;
tokenizing the text document in words to form a tokenized word list, wherein a token is one of a single word, an N-gram of N consecutive words, or an entire line of the document; and
returning the tokenized word list.

11. The computer readable program storage device of claim 10, wherein
the text document is a computer system log, and
the numeric data includes decimal numbers and hexadecimal addresses.

12. The computer readable program storage device of claim 9, wherein the method further comprises parsing and preprocessing the input query by
removing all punctuation from the input query,
parsing numeric data;
tokenizing the input query in words to produce a tokenized word list, wherein a token is one of a single word, an N-gram of N consecutive words, or an entire line of the input query; and
returning the tokenized word list.

13. The computer readable program storage device of claim 9, wherein retrieving a ranked list of text document segments of N lines that are similar to the aggregated word embedding representation of the query includes
comparing the aggregated word embedding representation of the query with the word embedding model of the text document segment of N lines using a similarity metric, and
retrieving those word embedding model representations of the text document segments of N lines whose similarity to the aggregated word embedding representation of the query is greater than a predetermined threshold, and
ranking the retrieved text document segments according to the similarities.

* * * * *